US010481885B2

(12) United States Patent
Lönnemark et al.

(10) Patent No.: US 10,481,885 B2
(45) Date of Patent: Nov. 19, 2019

(54) SYNCHRONIZATION OF A GRAPHICAL PROGRAM AND A ROBOT PROGRAM (75) Inventors: Gunilla Lönnemark, Linköping (SE); Steve Murphy, Göteborg (SE); Ragnar Nohre, Jönköping (SE); Niklas Skoglund, Västerås (SE); Daniel Wadenhof, Göteborg (SE)

(73) Assignee: ABB Schweiz AG, Baden (CH)

( * ) Notice: Subject to any disclaimer, the term of this patent is extended or adjusted under 35 U.S.C. 154(b) by 2016 days.

(21) Appl. No.: 12/300,594

(22) PCT Filed: Apr. 27, 2007

(86) PCT No.: PCT/EP2007/054166
§ 371 (c)(1),
(2), (4) Date: Nov. 12, 2008

(87) PCT Pub. No.: WO2007/131872
PCT Pub. Date: Nov. 22, 2007

(65) Prior Publication Data
US 2009/0164202 A1    Jun. 25, 2009

(30) Foreign Application Priority Data
May 11, 2006 (EP) .................................... 06113817

(51) Int. Cl.
*G06F 8/52* (2018.01)
(52) U.S. Cl.
CPC ...................... *G06F 8/52* (2013.01)
(58) Field of Classification Search
CPC ..... G06F 8/60; G06F 8/65; G06F 8/34; G06F 8/75
(Continued)

(56) References Cited

U.S. PATENT DOCUMENTS 5,495,410 A * 2/1996 Graf .............................. 700/86
6,138,270 A 10/2000 Hsu et al.
(Continued)

FOREIGN PATENT DOCUMENTS

| EP | 0528617 A | 2/1993 | |
| EP | 1205842 A | 5/2002 | |
| WO | WO 03012636 A1 * | 2/2003 | .................... 717/110 |

OTHER PUBLICATIONS

Walter A. Dos Santos et al.; Exploring Round-Trip Engineering Capabilities for Satellite Flight Software Products; IEEE; 2005, pp. 10D.2-1 to 10.D.2-11.
(Continued)

Primary Examiner — Wei Y Zhen
Assistant Examiner — Brahim Bourzik
(74) Attorney, Agent, or Firm — Seppo Laine Oy (57) ABSTRACT A device and a method for synchronization of a robot program and a graphical program. The device includes a first converter adapted to convert a graphical program into a first sequence of tokens representing data for motions and actions contained in the graphical program. A second converter is adapted to convert the robot program into a second sequence of tokens representing data for motions and actions contained in the robot program. A modification command generator is adapted to compare the first and second sequences of tokens and based thereon generate modification commands. The first converter is adapted to receive the modification commands and edit the graphical program based on the modification commands so that the token sequence of the graphical program matches the token sequence of the robot program. The second converter is adapted to receive the modification commands and edit the robot program based on the modification commands so that the token sequence of the (Continued)

robot program matches the token sequence of the graphical program.

14 Claims, 6 Drawing Sheets

(58) Field of Classification Search
USPC .................................................. 717/100–168
See application file for complete search history.

(56) References Cited

U.S. PATENT DOCUMENTS

| | | | |
|---|---|---|---|
| 6,167,328 A * | 12/2000 | Takaoka | B25J 9/1671 |
| | | | 318/568.1 |
| 6,233,589 B1 * | 5/2001 | Balcha et al. | 707/625 |
| 6,594,822 B1 * | 7/2003 | Schweitz et al. | 717/140 |
| 6,833,161 B2 | 12/2004 | Wang et al. | |
| 6,993,710 B1 * | 1/2006 | Coad | G06F 8/71 |
| | | | 715/202 |
| 2004/0225963 A1 * | 11/2004 | Agarwal et al. | 715/530 |

OTHER PUBLICATIONS

Wuu Yang; Identifying Syntactic Differences Between Two Programs; Software Practice & Experience, Jul. 1991; pp. 739 to 755.
PCT/ISA/210—International Search Report—dated Aug. 27, 2007.
PCT/ISA/237—Written Opinion of the International Searching Authority—dated Aug. 27, 2007.

* cited by examiner

```
Program:

target p1:=[[1881,-983,676],[0.330,0.571,0.651,0.376],[-1,1,-1,-1]];
  target p2:=[[1881,-649,879],[0.330,0.571,0.651,0.376],[-1,2,-2,-1]];
  target p3:=[[1868,-143,866],[0.571,0.330,0.376,0.651],[-1,1,-1,-1]];

PROC path()
    MoveL p1,v800,z100,tool0\WObj:=wobj0;
    AnotherInstr;
    MoveL p2,v800,z100,tool0;
    MoveL p3,v800,z100,tool0;
    AnotherInstr;
  ENDPROC
```

```
{sentence 1
   {token 11 {p1}}
   {token 12 {target}}
   {token 13 {[[1881,-983,676],[0.330,0.571,0.651,0.376],[-1,1,-1,-1]]}}}
{sentence 2
   {token 21 {p2}}
   {token 22 {target}}
   {token 23 {[[1881,-649,879],[0.330,0.571,0.651,0.376],[-1,2,-2,-1]]}}}
{sentence 3
   {token 31 {p4}}
   {token 32 {target}}
   {token 33 {[[1881,-449,964],[0.330,0.571,0.651,0.376],[-1,1,-1,-1]]}}}
{sentence 4
   {token 41 {p3}}
   {token 42 {target}}
   {token 43 {[[1868,-143,866],[0.571,0.330,0.376,0.651],[-1,1,-1,-1]]}}}
```

Fig. 5

```
{sentence 5
   {token 51 {MoveL}}
   {token 52 {ToPoint p1}}
   {token 53 {Speed v800}}
   {token 54 {Zone z100}}
   {token 55 {Tool tool0}}
   {token 56 {WObj wobj1}}}
{sentence 6
   {token 61 {MoveL}}
   {token 62 {ToPoint p2}}
   {token 63 {Speed v800}}
   {token 64 {Zone z100}}
   {token 65 {Tool tool0}}}
{sentence 7
   {token 71 {MoveJ}}
   {token 72 {ToPoint p4}}
   {token 73 {Speed v800}}
   {token 74 {Zone z100}}
   {token 75 {Tool tool0}}}
{sentence 8
   {token 81 {MoveL}}
   {token 82 {ToPoint p3}}
   {token 83 {Speed v800}}
   {token 84 {Zone z100}}
   {token 85 {Tool tool0}}}
```

Fig. 6

```
{sentence 1
    {token 11 {p1}}
    {token 12 {target}}
    {token 13 {[[1881,-983,676],[0.330,0.571,0.651,0.376],[-1,1,-1,-1]]}}}
{sentence 2
    {token 21 {p2}}
    {token 22 {target}}
    {token 23 {[[1881,-649,879],[0.330,0.571,0.651,0.376],[-1,2,-2,-1]]}}}
{sentence 3
    {token 31 {p3}}
    {token 32 {target}}
    {token 33 {[[1868,-143,866],[0.571,0.330,0.376,0.651],[-1,1,-1,-1]]}}}
```

Fig. 7

```
{sentence 4
    {token 41 {MoveL}}
    {token 42 {ToPoint p1}}
    {token 43 {Speed v800}}
    {token 44 {Zone z100}}
    {token 45 {Tool tool0}}
    {token 46 {WObj wobj0}}}
{sentence 5
    {token 51 {MoveL}}
    {token 52 {ToPoint p2}}
    {token 53 {Speed v800}}
    {token 54 {Zone z100}}
    {token 55 {Tool tool0}}}
{sentence 6
    {token 61 {MoveL}}
    {token 62 {ToPoint p3}}
    {token 63 {Speed v800}}
    {token 64 {Zone z100}}
    {token 65 {Tool tool0}}}
```

Fig. 8

```
Insert data sentence

New sentence =
{sentence 0
    {token 0 {p4}}
    {token 0 {robtarget}}
    {token 0 {[[1881,-449,964],[0.330,0.571,0.651,0.376],[-1,1,-1,-1]]}}}
```

Fig. 9

```
Insert instruction sentence before

Old sentence =
{sentence 6
    {token 61 {MoveL}}
    {token 62 {ToPoint p3}}
    {token 63 {Speed v800}}
    {token 64 {Zone z100}}
    {token 65 {Tool tool0}}}

New sentence =
{sentence 0
    {token 0 {MoveJ}}
    {token 0 {ToPoint p4}}
    {token 0 {Speed v800}}
    {token 0 {Zone z100}}
    {token 0 {Tool tool0}}}

Replace instruction token

Old token =
{token 46 {WObj wobj0}}

New token =
{token 0 {WObj wobj1}}
```

Fig. 10

```
target p1:=[[1881,-983,676],[0.330,0.571,0.651,0.376],[-1,1,-1,-1]];
target p2:=[[1881,-649,879],[0.330,0.571,0.651,0.376],[-1,2,-2,-1]];
target p3:=[[1868,-143,866],[0.571,0.330,0.376,0.651],[-1,1,-1,-1]];
target p4:=[[1881,-449,964],[0.330,0.571,0.651,0.376],[-1,1,-1,-1]];

PROC path()
  MoveL p1,v800,z100,tool0\WObj:=wobj1;
  AnotherInstr;
  MoveL p2,v800,z100,tool0;
  MoveJ p4,v800,z100,tool0;
  MoveL p3,v800,z100,tool0;
  AnotherInstr;
ENDPROC
```

SYNCHRONIZATION OF A GRAPHICAL PROGRAM AND A ROBOT PROGRAM

CROSS-REFERENCE TO RELATED APPLICATIONS

This application claims priority to European patent application 06113817.8 filed 11 May 2006and is the national phase under 35 U.S.C. § 371 of PCT/EP2007/054166 filed 27 Apr. 2007.

FIELD OF THE INVENTION

The present invention relates to a device and a method for synchronization of a robot program and a graphical program.

The invention is useful in connection with off-line programming and simulation of an industrial robot and in particular when the simulation contains a graphical description of how the robot will perform its task and the robot controller contains a textual language for describing how the robot will perform its task.

DESCRIPTION OF RELATED ART

Industrial robots are highly flexible devices used for a wide variety of operations in many different industrial applications. Industrial robots are conventionally programmed via a robot programming language that is very similar to conventional computer programming languages. The robot programming language includes a sequence of instructions where each instruction tells the robot controller what to do and how to do it. Typical robot programming languages include instructions for robot motion, handling input and output signals, program comments, and handling program flow: loops and conditions. Each industrial robot manufacturer has its own robot programming language.

Conventional robot controllers provide an editing device attached to the robot controller for instructing the robot and for recording and editing the sequence of instructions of the robot program. The sequences of instructions are conventionally saved into a computer file for off-line storage and for off-line editing. In the off-line form, the robot program includes one or more files containing instructions with arguments to each instruction detailing the operation that is to be done at each step. In addition to the instructions, there can be data associated with each instruction, for example, the point to which the robot is to move can in some cases be stored in the instruction, or in other cases stored in a data section of the program and referred to by specific instructions.

The programming of robots is a time consuming process and the conventional methods of using the robot during the programming and teaching process ties up the production equipment and delays production start. In order to save time and speed production start, it is highly desirable to program a robot off-line. Conventionally, this is done through an off-line graphical simulation. The simulation contains a graphical 3D representation of the robot and its environment as well as a graphical means of teaching and recording the operations and movements of the robot. The graphical simulation provides a much more natural and easy method for programming and visualizing an industrial robot, without tying down the actual equipment. In addition, the graphical environment allows an independence from the robot programming language used by the robot manufacturer. However, the graphical 3D simulations do not have the ability to represent all of the features that are available in the actual robot programming language. For example, the 3D simulations do show neither the program flow, loops and conditions, nor comments in the program. Much of the input-output handling is also not shown in the 3D simulation.

The output from the work with the graphical simulation is a graphical program including a graphical representation of what the robot should do during operation. For example, the graphical program includes 3D points and sequences, it may also include attributes of the motion, such as the description of how the robot is to take corners and how fast the tool of the robot is to move relative to a part, as well as process information for processes such as arc welding, spot welding, etc. When the simulation and off-line programming is completed, the graphical program must be converted or translated to an actual robot program. Conventionally, the translation from the graphical program to the robot program is accomplished by a one-way translator, which converts 3D points and sequences and other information along a 3D object into a sequence of motion instructions for a specific robot programming language. The robot program is then transferred to the actual robot controller.

This robot program is almost never entirely correct or complete. The program flow must be added to ensure correct loops and handling of conditions. Input-output signals and handling is added too. Errors in calibration between the real world and 3D simulation mean that many instructions and positions must be modified in order for the robot to function without collisions. In addition, late modifications to the equipment mean that new instructions must be added. In the pressure to improve the throughput of the robot, instructions are modified to increase the speed of the robot and decrease the accuracy of the robot's motions in corners and in large movements. Finally, the program on the controller is commented, allowing future programmer the ability to understand the logic of the program and the reasoning behind the modifications. Comments are added throughout the program to improve the readability and maintainability of the robot program.

All of the above modifications, means that the actual robot program is often very different from the description in the 3D off-line simulation. After this work has been done, conventionally, the 3D graphical simulation can no longer be used. If a programmer were to use the graphical program, generated during the 3D simulation, to make a modification, then all of the above changes would have to be re-done. This means that the 3D simulation is no longer a valid programming tool and the benefits of off-line programming are lost unless the 3D simulation can be updated with the actual program data from the real robot program.

Conventionally, robot and 3D simulation manufacturers try to update the 3D simulation from the robot program via another one-way translator, which takes a robot program and converts it into a graphical program that is a 3D representation of the robot motion. Thereby, the program flow and conditions, many of the input-output handling, and the comments in the program are discarded.

The conventional solution for trying to work around this limitation is to separate the robot program into sections, subroutines, and/or modules, where the robot instructions concerned with movement, which can be loaded back into the 3D simulation without loss, are kept in a separate section, routine, or module from the instructions that handle program flow, conditions, input-output handling and comments. This approach has disadvantages in that the entire program cannot be handled by the simulation system and there is manual work necessary to reassemble the entire program again after modifications to a section, routine, or module from the 3D simulation system. Thus, conventional 3D simulation and off-line programming tools provide a 'download' translator and an 'upload' translator.

However, there is a desire to use a 3D graphical simulation to generate a robot program, to modify the program on the actual robot, and to seamlessly and, without loss, load the program back into the 3D simulation and modified it again without artificially splitting the program.

OBJECTS AND SUMMARY OF THE INVENTION

The object of the present invention is to find an attractive solution, which alleviates the problems mentioned above.

According to one aspect of the invention, this object is achieved by a method for synchronization of a robot program and a graphical program.

Such a method includes the following steps: receiving information on which of the programs is to remain unchanged during the synchronization, in the following called a leader program for the synchronization, and which of the programs to be modified according to the program that is selected as the leader program, in the following called a follower program, converting the graphical program into a first sequence of tokens representing data for motions and actions contained in the graphical program, converting the robot program into a second sequence of tokens representing data for motions and actions contained in the robot program, comparing the first and second sequences of tokens and based thereon generating modification commands in dependence on which program is the leader and which is the follower, and editing the follower program based on the generated modification commands so that the token sequence of the follower matches the sequence of the leader. The sequence of the follower shall be equal to the sequence of the leader, i.e. each token of the sequence of the follower shall match a token in the sequence of the leader in the same order.

The present invention provides a solution by which motion content in a graphical program in an off-line simulation environment and a native language program in a robot controller can be updated and kept consistent with each other. Accordingly, the present invention provides a method capable of synchronizing the graphical program, generated during the simulation, with the robot program in the robot controller without loss of program flow, input-output handling, or comments and other non-motion instructions. Modifications of the motion content of either the graphical program or the robot program may be transferred back from the graphical representation to the robot language representation and vice versa without re-generation or loosing the rest of the program or graphical context. This is of critical importance in all off-line programming implementations.

The motion content of the graphical program and the native language robot program is represented as a series of tokens. The concept of tokens forms a neutral representation of the sequence and data in the graphical and native language programs, which makes it possible to compare the programs.

According to an embodiment of the invention, the editing step includes editing the sequence of tokens of the follower so that the token sequence matches the sequence of the leader and converting the edited sequence of tokens of the follower back to the original program form, i.e. back to the graphical program or the robot program dependent on which of them is selected to be the follower. Although, it is possible to generate modification commands for direct editing of the original program, i.e. the graphical or the robot programs, it is much easier to generate modification commands for a sequence of token and to edit the sequence.

According to an embodiment of the invention, said programs are converted into sequences of sentences built up of said tokens, and said modification commands includes insert sentence, delete sentence and edit token. The breakdown into sentences and tokens provides the ability to work with entire instructions, i.e. the sentences, and parameters of the instructions, i.e. the tokens. For example, a simple motion instruction may consist of the single instruction "Linear p1, 1000", instructing the robot to move linearly to point "p1" at a speed of 1000 mm/s. The serialization would convert the instruction into a single sentence with 3 tokens: "linear", "p1", and "1000". When synchronizing a graphical representation with the textual program representation, the use of sentences and tokens allows the greatest possible freedom for the modification command generator to find the minimum number of changes necessary to bring one representation into synchronization with the other.

According to an embodiment of the invention, the difference between the first and second sequence of token is calculated by means of a Longest Common Subsequence (LCS) algorithm. Longest common subsequence algorithms are commonly used for finding a longest sequence, which is a subsequence of all sequences in a set of sequences (often just two). This embodiment is particularly advantageous since the longest common subsequence between the two representations provides an indication for the most common set of sentences and tokens. The longest common subset is thus the set of sentences and tokens that do not have to be changed. This means that the algorithm automatically finds the least number of changes necessary to bring one representation into synchronization with the other. Finding the least number of changes is advantageous in that all surrounding comments, logic, program flow are kept as-is with-out risk for unwanted modifications.

As mentioned above, robot-programming languages may also contain a data section that is used by the instructions. In the example above, the "p1" is a reference to a data section where the actual coordinates (joint or linear) of the target are maintained. In an embodiment of the invention, the data sections of a program are also synchronized with the graphical representation. When the data sections are to be synchronized, these are done first, and then secondly the instructions are synchronized. This is accomplished by the same method of generating sentences and tokens and finding the Longest Common Subsequence to direct the modifications to either the graphical or the textual representation.

According to a further aspect of the invention, the object is achieved by a computer program product directly loadable into the internal memory of a computer or a processor, comprising software code portions for performing the steps of the method when the program is run on a computer. The computer program is provided either on a computer-readable medium or through a network.

It is easy to realize that the method according to the invention is suitable for execution by a computer program having instructions corresponding to the steps in the inventive method when run on a processor unit.

According to another aspect of the invention, the object is achieved by a computer readable medium having a program recorded thereon, when the program is to make a computer perform the steps of the method and the program is run on the computer.

According to another aspect of the invention, this object is achieved by a device for synchronization of a robot program and a graphical program.

Such a device comprises: a first converter adapted to convert a graphical program into a first sequence of tokens representing data for motions and actions contained in the graphical program, a second converter adapted to convert the robot program into a second sequence of tokens representing data for motions and actions contained in the robot program, and a modification command generator adapted to compare the first and second sequences of tokens and based thereon generate modification commands, wherein said first converter is adapted to receive said modification commands and edit the graphical program based on the modification commands so that the token sequence of the graphical program matches the token sequence of the robot program and said second converter is adapted to receive said modification commands and edit the robot program based on the modification commands so that the token sequence of the robot program matches the token sequence of the graphical program.

The present invention employs a modification command generator that works together with two converters. One converter works towards the graphical program, while the other converter works towards the robot program. The converters are responsible for converting the graphical program and robot program into a sequence of token. According to an embodiment of the invention, the graphical program and robot program is converted into a sequence of sentences. Each sentence is built up of tokens where each token represents an indivisible piece of information. The modification command generator calculates the differences between the two sentence sequences, for example, via a Longest Common Subsequence method. The differences are converted into editing instructions, called modification commands, and sent back to one or the other converter for modifying either the graphical program or the robot program.

According to an embodiment of the invention, the device is adapted to receiving information on which program is to be the leader for the synchronization and which program is to be the follower, and the modification command generator is adapted to generate and send said modification commands to either the first or the second converter in dependence on which program is the leader and which is the follower. The follower is synchronized in accordance with the leader. This embodiment makes it possible for a user to select which of the programs, i.e. the graphical or the robot programs, is to be synchronized according to the other program.

According to another aspect of the invention, the Modification command generator uses any other form of differencing algorithm that produces a set of changes that brings one sequence of sentences into agreement with the other.

According to another aspect of the invention, the graphical representation is not 3D-based, but based upon Icons, where each icon represents an instruction or action for the robot. Icons are assembled into sequences to represent the task for the robot.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
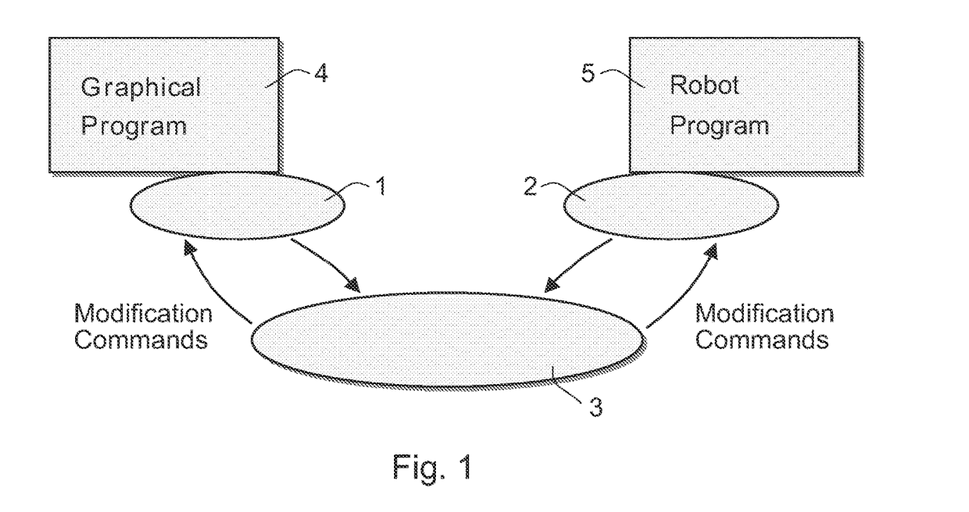
FIG. 1 shows a block diagram over a synchronization device according to the invention.

FIG. 1 shows a block diagram over a synchronization device according to the invention. The device contains three objects; a first converter 1, which converts a graphical program into a series of sentences and receives modification commands, a second converter 2, which converts a robot program into a series of sentences and receives modification commands, and a modification command generator 3, which finds the differences between the two series of sentences and sends modification commands to the converters. The modification command generator finds the changes necessary to make the follower's sequence match the leader's sequence. The graphical program is stored in a memory area on a computer used for off-line programming of the robot. The robot program is stored in a memory area on the robot controller 5. All three objects are implemented by software.

The robot program is stored in a memory area on the robot controller or in a virtual controller on the off-line computer. In addition, the invention includes the situation where the robot program is stored in a file and a parser is provided which can read the data sections and instructions in the robot program and give the necessary responses to the converter to generate the sequences of sentences and tokens and to change the program in response to the synchronization.

In one embodiment of the invention, the graphical program is implemented in the 3D simulation system, the robot program is implemented in a virtual controller, which accurately simulates the real controller's ability to store and modify programs. The modification command generators are implemented in the 3D simulation system and communicate to the graphical representation and to the virtual controller.

A graphical program comprises one or more movement paths including targets and actions given in sequence and shown on a graphical display. Each target contains attributes for the motion, linear, joint, speed, zone etc. The actions contain events such as I/O and/or program events that will occur along the path. The path, targets, attributes and actions are necessary for graphical programming and the analysis of a graphical robot program.

The first converter 1 is given a path and converts the graphical sequence of targets and actions to a sequence of sentences made up of tokens. Each sentence represents either a complete motion or an individual action. A complete motion contains all the tokens for position, tool, and object frame that describe the robot geometry at the target position. Each token represents the data for the motion, i.e. data for the tool frame, data for the object frame, data for the speed, etc. The first converter 1 will consider only those motions and actions, which have an equivalent program representation for serialization. The converter 1 does not have to consider all possible instructions available for the specific robot. Only the instructions that are of interest or ability to synchronize need be considered. For example, in the case where there is no graphical representation, for example a FOR-NEXT loop, then the converter does not need to convert the FOR-NEXT loop and the synchronization proceeds anyway.

During synchronization, when the first converter 1 is the follower, it must accept modification commands from the modification command generator and insert, delete sentences and edit tokens; converting them back into the graphical representation in their correct position along the path.

A native language robot program comprises program flow elements, such as subroutines, functions, if-then-else, while, I/O instructions, process instructions, motion instructions as well as data elements for holding the specific target, speed, tool etc data.

The second converter 2 is given either a program, subroutine, or an array of motions, depending upon the robot language. The second converter 2 then builds a sequence of sentences, each sentence containing only the complete motions and actions but with the same sequence as found in the robot program. Each sentence contains tokens representing the data for the motion and actions.

During synchronization, when second converter 2 is the follower, it must receive modification commands from the modification command generator and insert, delete sentences and edit tokens, converting them back into the robot program representation.

The object modification command generator's function is to compare a sequence of sentences and tokens and to send modification commands to either the first converter 1 or the second converter 2, depending upon which is the leader and which is the follower. The comparison can be based upon many known methods for comparing data, for example the Longest Common Subsequence method that minimizes the modifications for the follower. Modification commands are sent to either Converter in the form: Insert Sentence, Delete Sentence, Edit Token.

Figure 2:
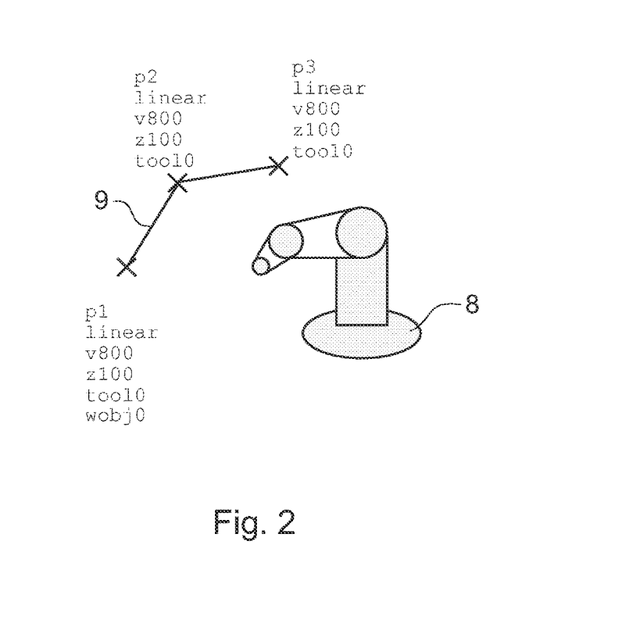
FIG. 2-11 shows a detailed example of how the invention functions.

In the following, an example of the invention will be explained in detail with reference to FIGS. 2-11. The example begins with a graphical program, as shown FIG. 2, and a textual program, as show in FIG. 3. The graphical program in FIG. 2 shows a simulated robot 8 and a path 9 in space, or equally applicable, a path attached to a geometric object. In this example, the path has three points, p1, p2, and p3 with a number of attributes describing how the simulation should move to the points (linearly), the speed to be used, (800 mm/s), the size of the zone for point accuracy (100 mm) and the tool (tool 10) to be used, and optionally the work object (wobj0) in which the point is represented. The textual program shown in FIG. 3 contains the equivalent robot program representation of the graphical program. The two representations can be said to be 'in sync' with each other.

Figure 4:
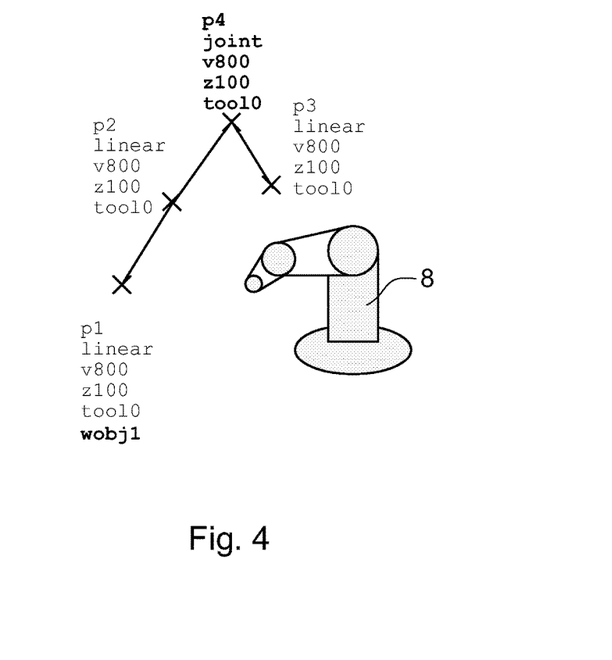

In this example, we will show the case where the graphical program is the master and the textual program is the copy. Thus, in the example, a user of the simulation and off-line programming tool may make a modification to the graphical program. A typical case is the addition of a new point and a modification of the work object used for p1. The modified graphical program is shown in FIG. 4. At this point in the example, the goal is to synchronize the modified graphical program with the original textual program to produce a new textual program containing the new elements and modifications.

Figure 3:
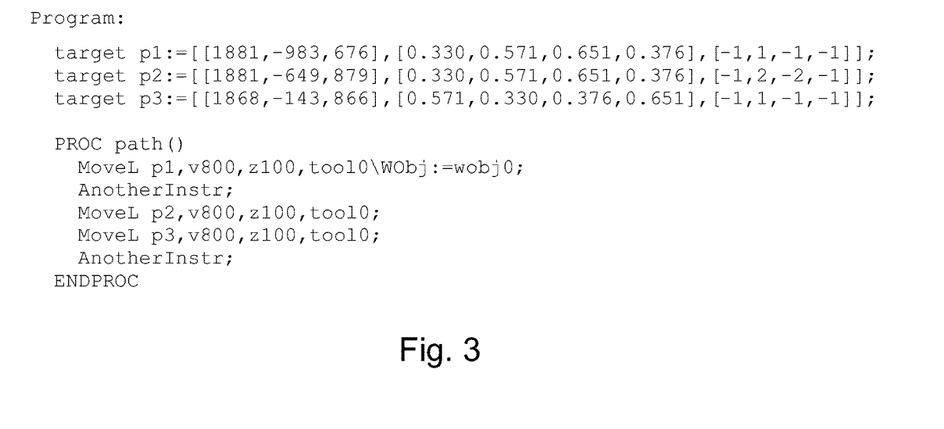
Figure 5:
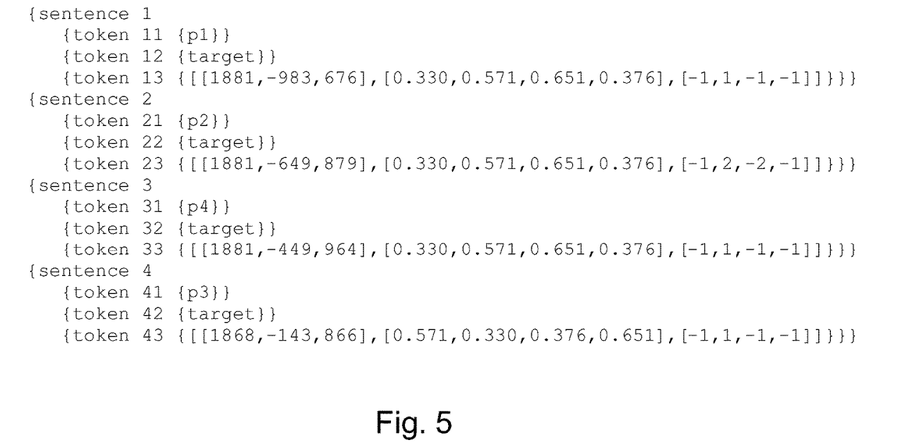
Figure 6:
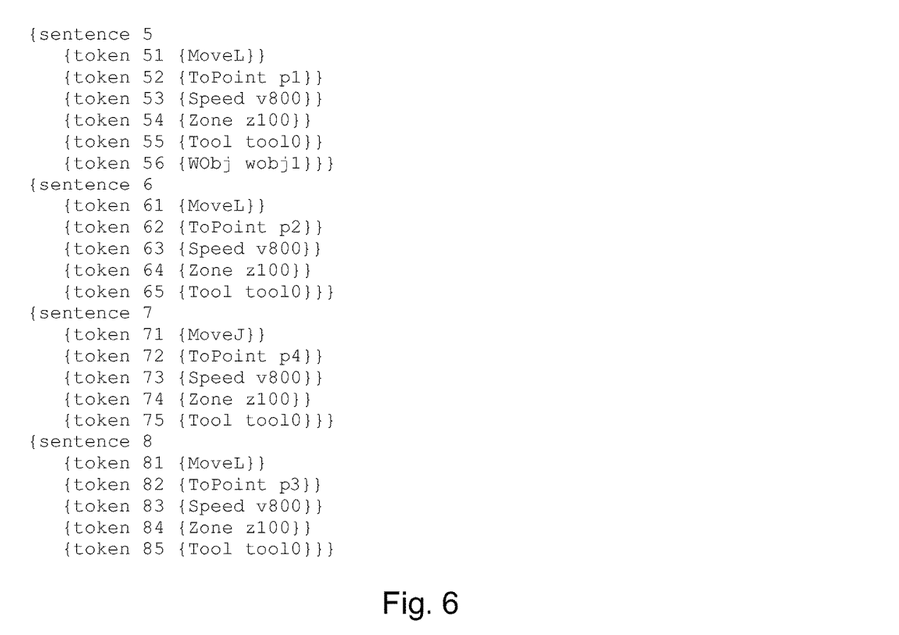
Figure 7:
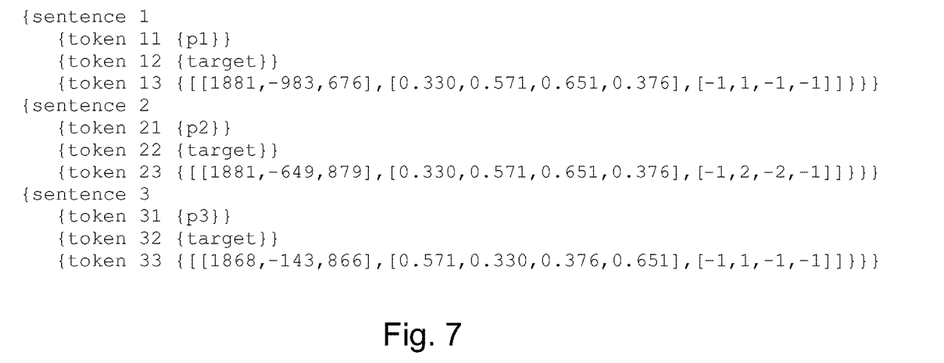
Figure 8:
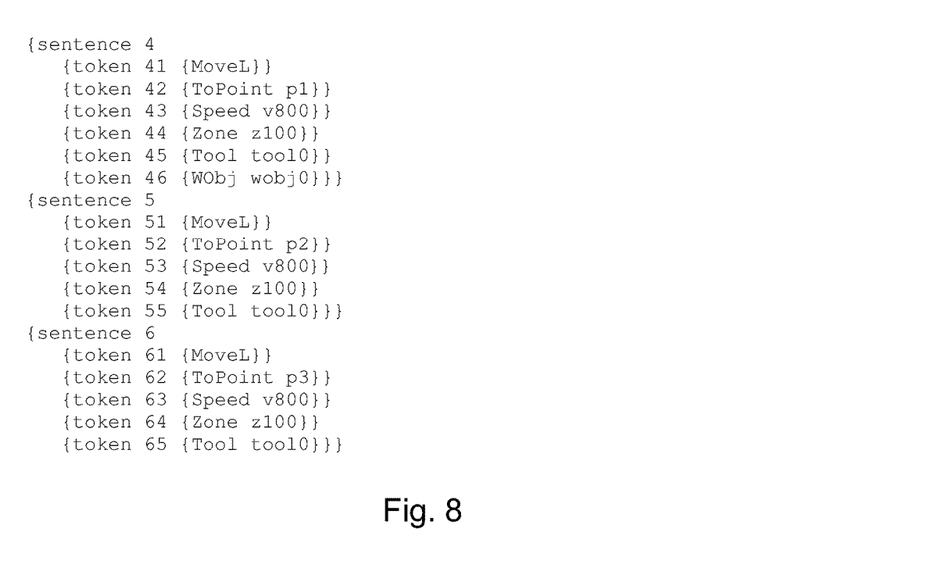

The generation of sentences and tokens will now be described with reference to FIGS. 5-8. Even though the synchronization works equally well with data as with the instructions in the program, it has been found that it is best to synchronize the data first. The converter 1 for the graphical representation would produce the serialized data as shown in FIG. 5. FIG. 1 shows serialized data after graphical modification. The converter 1 would also produce the serialized instructions as shown in FIG. 6. FIG. 2 shows serialized instructions after graphical modification. Accordingly, the converter 2, attached to the textual program would also produce it's own serializations data and instructions of the textual program. These are show in FIGS. 7 and 8. FIG. 3 shows serialized data from the textual program. FIG. 4 shows serialized instructions from the textual program.

The next step is to use the modification command generator 3 to compare the serialized data and serialized instructions and generate the modification commands that would make the textual version (the copy) the same as the graphical version (the master). Note that either graphical or textual version can be the master version for the purposes of synchronization. The modification command generator takes the above serialized data and instruction streams and produces editing commands that make the copy identical to the master.

Figure 9:
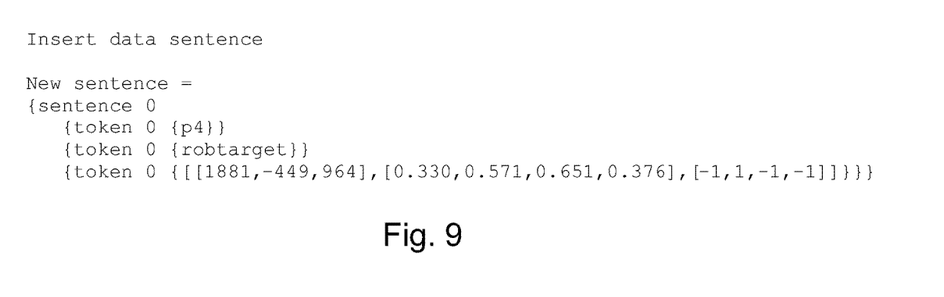
Figure 10:
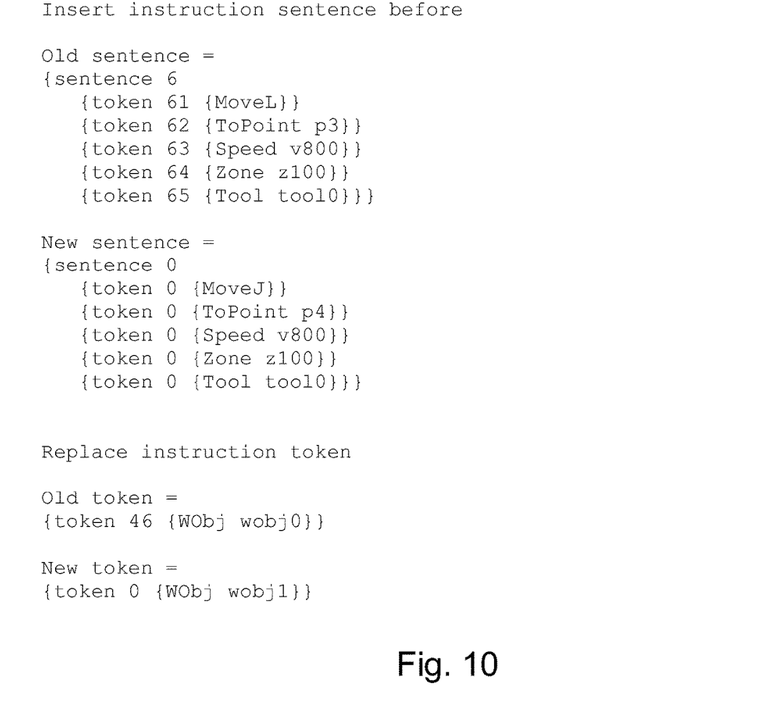
Figure 11:
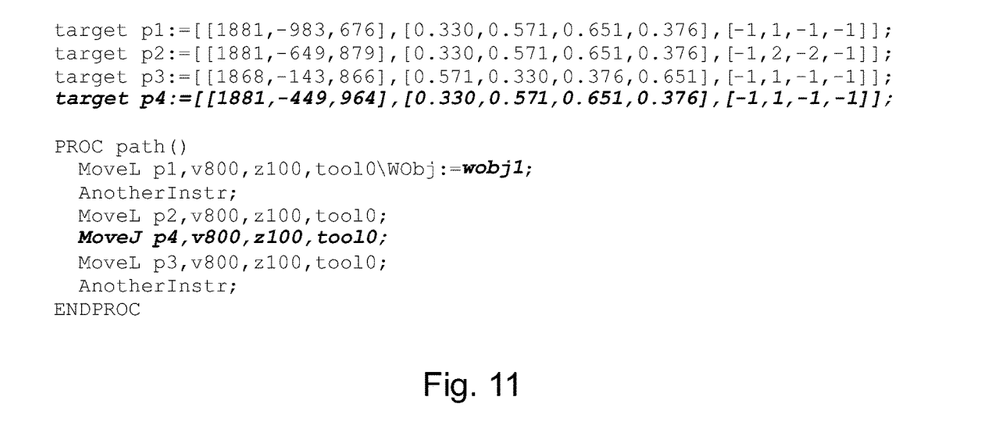

The FIGS. 9 and 10 shows the generalized editing commands that would be generated from a modification command generator using the Longest Common Subset algorithm. FIG. 5 shows editing commands for the data and FIG. 6 shows editing commands for the instructions. These editing commands are sent from the modification command generator to the converter 2. The converter 2 applies the editing commands to the textual program. The resulting modified textual program is shown in FIG. 11 with the resulting modifications shown in italics.

It is important to note that the editing commands are a minimum set of editing commands necessary to bring the textual program into synchronization with the graphical program. This approach leaves the remaining text untouched and thus allows white space and comments to be preserved. In addition, the approach allows the graphical program or the textual program to be the master without any added limitations.

Figure 12:
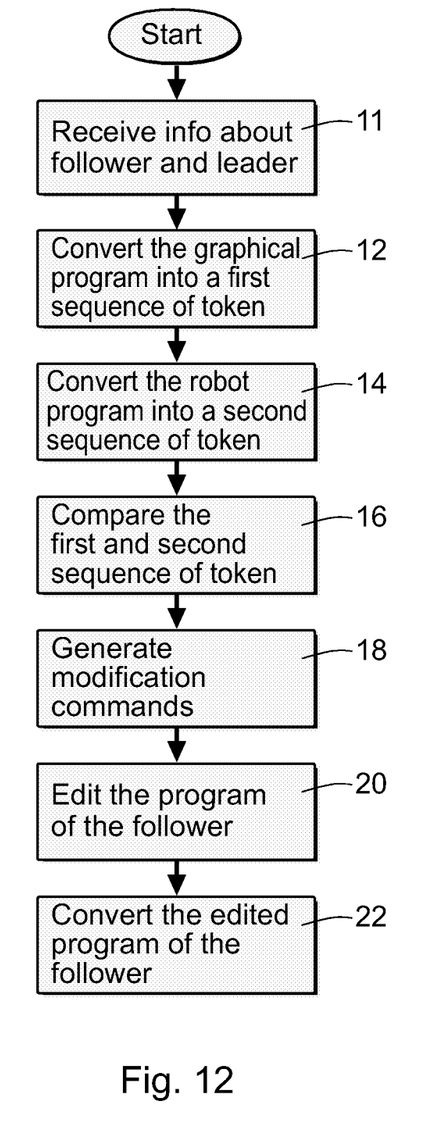
FIG. 12 shows a flow chart over a method according to an embodiment of the invention.

FIG. 12 is a flow chart illustration of the method and the computer program product according to an embodiment of the present invention. It will be understood that each block of the flow chart can be implemented by computer program instructions. A graphical program and native language program are kept in synchronization by the following sequence:

Block 11: Information on which program is to be the leader for the synchronization and which program is to be the follower is received. The user selects which program (graphical, or robot) is to be the leader for the synchronization and which is to be the follower. The program that is selected as the follower is to be modified according to the program that is selected as the leader, i.e. the follower program is changed and the leader program remains unchanged.

Block 12: The graphical program is converted into a first sequence of tokens representing data for motions and actions contained in the graphical program. Converter 1 converts the graphical programs to sequences of sentences and tokens.

Block 14: The robot program is converted into a second sequence of tokens representing data for motions and actions contained in the robot program. Converter converts the robot programs to sequences of sentences and tokens, as shown in FIG. 2. In which order the conversion of the graphical and robot program is executed is irrelevant, i.e. the robot program can be converted before the graphical program or the conversion could be performed in parallel.

The data represented by the tokens is exchanged from Converter 1 to Converter 2 depending upon which is the leader.

Block 16: The first and second sequences of tokens are compared. The sequences of sentences and tokens are sent to the modification command generator. The modification command generator compares the sequences.

Block 18: Modification commands are generating in dependence on which program is the leader and which is the follower based on the comparison between the first and second sequence. The modification command generator sends modification commands to either converter 1 or converter 2 depending upon which one is the follower.

Block 20: The sequence of tokens of the follower is edited based on the generated modification commands so that the token sequence of the follower matches the sequence of the leader. The following converter receives the modification commands and edits its program accordingly such that its sentence and token sequence matches the leader exactly.

Block 22: The edited sequence of tokens of the follower is converted back to the original program form, i.e. back to the graphical or robot program.

The software for carrying out the method according to the invention is, for example, stored and executed on the robot controller or on the computer used for the off-line programming and simulation. However, it is also possible to store and execute the software on any other external computer.

The invention claimed is:

1. A method for synchronizing a graphical program generated in an off-line simulation environment and a robot program, wherein the graphical program includes a graphical 3D representation of robot motions along a path including 3D points and actions given in a sequence, the actions contain events that will occur along the path, and the robot program includes a sequence of textual instructions for robot motions and actions, the method comprising:
  receiving information on which of the programs is a leader program during synchronization and which of the programs is a follower program during synchronization, wherein the leader program is to remain unchanged during the synchronization, the follower program is to be modified according to the leader program, and wherein both the graphical program and robot program are capable of being selected as the leader program,
  converting the sequence of 3D points and actions of the graphical program into a first sequence of tokens including data and instructions for motions and actions contained in the graphical program,
  converting the motion content of the robot program into a second sequence of tokens including data and instructions for motions and actions contained in the robot program,
  comparing the first and second sequences of tokens and based thereon:
  generating modification commands in dependence on which program is the leader and which is the follower, and
  editing the follower program based on the generated modification commands so that the token sequence of the follower matches the sequence of the leader.

2. The method according to claim 1, wherein the editing comprises editing the sequence of tokens of the follower so that the token sequence matches the sequence of the leader, and converting the edited sequence of tokens of the follower back to the original program form.

3. The method according to claim 1, wherein said programs are converted into sequences of sentences built up of said tokens, and said modification commands include: insert sentence, delete sentence and edit token.

4. The method according to claim 1, wherein the difference between the first and second sequences of token is calculated by a Longest Common Subsequence algorithm.

5. A computer program product, comprising:
  a non-transitory computer readable medium; and
  computer program instructions recorded on the computer readable medium and executable by a processor for performing a method for synchronizing a graphical program generated in an off-line simulation environment and a robot program, wherein the graphical program includes a graphical 3D representation of robot motions along a path including 3D points and actions given in a sequence, the actions contain events that will occur along the path, and the robot program includes a sequence of textual instructions for robot motions and actions, the method comprising
  receiving information on which of the programs is a leader program during synchronization and which of the programs is a follower program during synchronization, wherein the leader program is to remain unchanged during the synchronization, the follower program is to be modified according to the leader program, and wherein both the graphical program and robot program are capable of being selected as the leader program,
  converting the sequence of 3D points and actions of the graphical program into a first sequence of tokens including data and instructions for motions and actions contained in the graphical program,
  converting the motion content of the robot program into a second sequence of tokens including data and instructions for motions and actions contained in the robot program,
  comparing the first and second sequences of tokens and based thereon:
  generating modification commands in dependence on which program is the leader and which is the follower, and
  editing the follower program based on the generated modification commands so that the token sequence of the follower matches the sequence of the leader.

6. A device comprising a processor for synchronizing a graphical program generated in an off-line simulation environment and a robot program, wherein the graphical program includes a graphical 3D representation of robot motions along a path including 3D points and actions given in a sequence, the actions contain events that will occur along the path, and the robot program includes a sequence of textual instructions for robot motions and actions, the device comprising:
  a first converter adapted to convert a sequence of 3D points and actions of a graphical program into a first sequence of tokens including data and instructions for motions and actions contained in the graphical program,
  a second converter adapted to convert the motion content of the robot program into a second sequence of tokens including data and instructions for motions and actions contained in the robot program, and
  a modification command generator adapted to compare the first and second sequences of tokens and based thereon generate modification commands, wherein said first converter is adapted to receive said modification commands and edit the graphical program based on the modification commands so that the token sequence of the graphical program matches the token sequence of the robot program and said second converter is adapted to receive said modification commands and edit the robot program based on the modification commands so that the token sequence of the robot program matches the token sequence of the graphical program.

7. The device according to claim 6, wherein the device is adapted to receiving information on which of the programs is to remain unchanged during the synchronization, in the following called a leader program for the synchronization, and which of the programs to be modified according to the program that is selected as the leader program, in the following called a follower program, and the modification command generator is adapted to generate and send said modification commands to either the first or the second converter in dependence on which program is the leader and which is the follower.

8. The device according to claim 7, wherein said converters are adapted to edit the sequence of tokens of the follower so that the token sequence matches the sequence of the leader and converting the edited sequence of tokens of the follower back to the original program form.

9. The method according to claim 1, further comprising utilizing off-line programming of an industrial robot.

10. The method of claim 1, wherein the robot program includes comments.

11. The method of claim 1, wherein elements from the graphical program sequence are selectively converted.

12. The method of claim 1, wherein elements from the robot program sequence are selectively converted.

13. The method of claim 1, wherein the conversion of the robot program and the conversion of the graphical program are performed simultaneously.

14. The method of claim 1, wherein the graphical program includes a graphical representation of the robot.

\* \* \* \* \*